(12) United States Patent
Yang et al.

(10) Patent No.: US 9,788,145 B2
(45) Date of Patent: Oct. 10, 2017

(54) DETECTION OF DEVICE MOTION AND NEARBY OBJECT MOTION

(75) Inventors: Lei Yang, Hillsboro, OR (US); Sharon Yang, Arcadia, CA (US); Anthony G. Lamarca, Seattle, CA (US)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 13/976,694

(22) PCT Filed: Feb. 29, 2012

(86) PCT No.: PCT/US2012/027112
§ 371 (c)(1),
(2), (4) Date: Jun. 27, 2013

(87) PCT Pub. No.: WO2013/130067
PCT Pub. Date: Sep. 6, 2013

(65) Prior Publication Data
US 2014/0213284 A1    Jul. 31, 2014

(51) Int. Cl.
*H04W 4/02* (2009.01)
*G01S 11/06* (2006.01)
*G01P 13/00* (2006.01)
*H04W 64/00* (2009.01)

(52) U.S. Cl.
CPC .............. *H04W 4/02* (2013.01); *G01P 13/00* (2013.01); *G01S 11/06* (2013.01); *H04W 64/006* (2013.01)

(58) Field of Classification Search
CPC ........... H04W 4/02; G01P 13/00; G01S 11/06
USPC ..................................................... 455/456.1
See application file for complete search history.

(56) References Cited

U.S. PATENT DOCUMENTS

| | | | | |
|---|---|---|---|---|
| 6,067,460 | A * | 5/2000 | Alanara et al. ............... | 455/574 |
| 6,151,487 | A * | 11/2000 | Kim et al. .................... | 455/134 |
| 6,505,053 | B1 * | 1/2003 | Winters ............. | H04B 17/3913 |
| | | | | 342/383 |
| 7,317,419 | B2 | 1/2008 | Sugar et al. | |
| 8,213,978 | B1 * | 7/2012 | Ho ......................... | H04W 24/02 |
| | | | | 370/227 |
| 2005/0119002 | A1 * | 6/2005 | Bauchot et al. ............. | 455/441 |
| 2008/0004062 | A1 * | 1/2008 | Nibe ..................... | H04W 28/22 |
| | | | | 455/519 |

(Continued)

OTHER PUBLICATIONS

International Search Report, PCT/ISA/210, Nov. 7, 2012, total of 3 sheets.

*Primary Examiner* — Qun Shen
(74) *Attorney, Agent, or Firm* — Pillsbury Winthrop Shaw Pittman LLP (57) ABSTRACT

In accordance with various aspects of the disclosure, a system, method, and device for detecting motion based on channel fading characteristics are presented. One or more packets may be received wirelessly from a wireless transmitter. A fading profile may be determined for each packet. From the plurality of fading profiles, one or more parameters indicative of fading change, changes in shape of fading profiles, fading variance, and of other channel characteristics may be determined. A classifier function may be trained to associate parameter values with a lack of motion, with device motion, or with motion of an object in the vicinity of a stationary wireless-enabled device. The classifier function may be used to determine whether there is motion based on one or more subsequently received packets.

18 Claims, 10 Drawing Sheets

(56) References Cited

U.S. PATENT DOCUMENTS

| | | | |
|---|---|---|---|
| 2008/0018521 A1 | 1/2008 | Sahinoglu et al. | |
| 2010/0080178 A1* | 4/2010 | Cox ................... | H04W 72/048 |
| | | | 370/329 |
| 2010/0304761 A1 | 12/2010 | Seibert et al. | |
| 2011/0022349 A1* | 1/2011 | Stirling ................ | A61B 5/1038 |
| | | | 702/141 |
| 2011/0096033 A1* | 4/2011 | Ko .......................... | G06F 3/017 |
| | | | 345/175 |
| 2011/0244887 A1* | 10/2011 | Dupray et al. ............. | 455/456.2 |
| 2012/0190380 A1* | 7/2012 | Dupray et al. ............. | 455/456.1 |
| 2012/0202421 A1* | 8/2012 | Moosavi ........... | H04W 52/0254 |
| | | | 455/41.1 |
| 2014/0247179 A1* | 9/2014 | Furuskog .............. | G01S 13/003 |
| | | | 342/28 |

* cited by examiner

DETECTION OF DEVICE MOTION AND NEARBY OBJECT MOTION

CROSS REFERENCE TO RELATED APPLICATIONS

This application is the U.S. National Stage of PCT/US2012/027112, filed Feb. 29, 2012, the contents of which are hereby incorporated by reference herein in its entirety.

TECHNICAL FIELD

This disclosure relates generally to motion detection, and more particularly to the detection of motion by wireless-enabled devices.

BACKGROUND ART

Current trends appear to indicate that the motion of wireless-enabled devices may provide some insight into a user's state. That is, the motion of a wireless-enabled device may indicate some information regarding where the wireless-enabled device is, how it is being used, or other context-based information. Such information may then be applied to a variety of applications, such as, social networking, asset tracking, assisted living services, etc.

Conventional motion detection techniques rely on established technologies, such as global positioning systems (GPS), accelerometers, or cameras. GPS technology or an accelerometer may be used to detect motion of the device itself, while a camera may be used to detect motion of a user or other object within the camera's line of sight. These techniques, however, have their limitations. For example, a device that relies on GPS tracking or a camera for motion detection may raise privacy concerns while a device that incorporates accelerometer-type devices may raise manufacturing costs and introduce hardware complexities. Although some devices have begun to use received signal strength indication (RSSI) to detect a change in a wireless-enabled device's location relative to a signal transmitter, large variations in RSSI may make such detection unreliable.

DESCRIPTION OF THE EMBODIMENTS

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a method and device for detecting motion is presented. The device may include a receiver configured to receive a wireless signal and one or more processors communicatively coupled to the receiver. The one or more processors may be configured to determine one or more parameters that indicate how the wireless signal received by the device experiences fading attenuation at the device. The one or more processors may determine, based on the one or more parameters, whether the device is moving, whether an object in an environment of the device is moving, or any combination thereof.

In accordance with various embodiments of this disclosure, the one or more processors may be configured to determine whether the device is moving based on a classifier function that relates the one or more parameters to whether the device is moving. In some instances, the one or more processors are further configured to train the classifier function by associating one or more values of the one or more parameters with movement of the device.

In accordance with various embodiments of this disclosure, the one or more processors are configured to determine whether the object is moving based on a classifier function that relates the one or more parameters to whether the object is moving. In some instances, the one or more processors are further configured to train the classifier function by associating one or more values of the one or more parameters with movement of the object.

In accordance with various embodiments of this disclosure, the one or more processors are configured to determine the one or more parameters by determining a difference between a first fading profile and a second fading profile. The first fading profile indicates how a first wireless signal received by the device experiences fading attenuation at the device, and the second fading profile indicates how a second wireless signal received by the device experiences fading attenuation at the device. In some instances, the one or more parameters are indicative of one or more differences in shape between the two fading profiles. In some instances, the one or more parameters are indicative of variance or standard deviation among at least the two fading profiles.

In accordance with various embodiments of this disclosure, the receiver is configured to receive an IEEE 802.11 or an IEEE 802.16 signal.

In accordance with various embodiments of this disclosure, the environment of the device is an indoor environment.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 1:
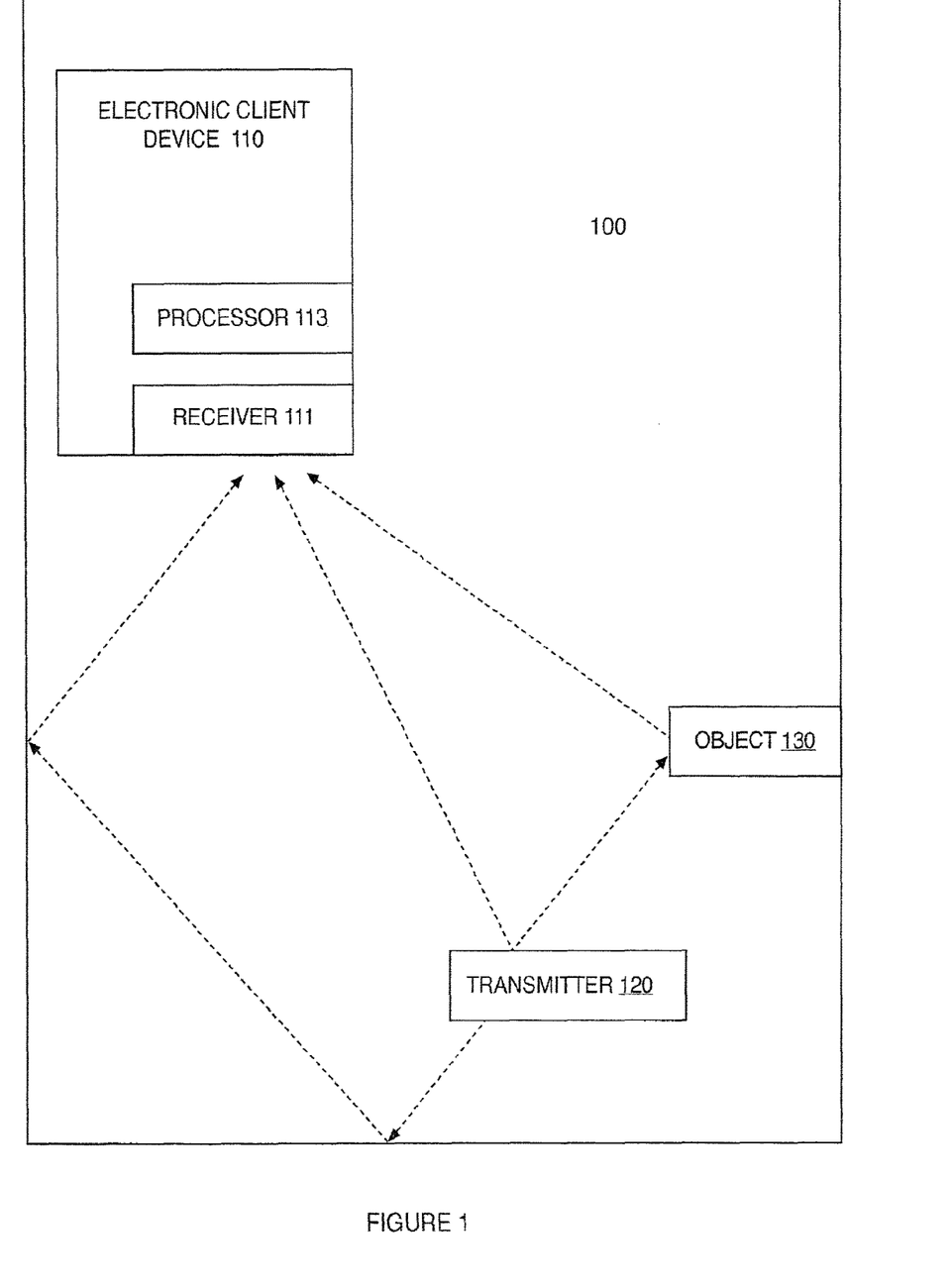
FIG. 1 depicts an example system for detecting motion based on a channel fading profile, in accordance with various aspects and principles of the present disclosure.

Turning now to the various aspects of the disclosure, FIG. 1 depicts a non-limiting example of a system, such as system 100, for detecting motion based on channel characteristics of wireless signals. System 100 may be configured to detect when a wireless-enabled device, such as a laptop or cellular phone, is moving or for detecting when the wireless-enabled device is stationary and an object, such as a person, is moving within a vicinity of the wireless-enabled device. Detecting motion of the wireless-enabled device may provide information indicative of where the wireless-enabled device is, how it is being used, or other context-based information. For example, movement of the wireless-enabled device may be used to track the activity level of a patient in an assisted-living center. In another example, the wireless-enabled device may be a receiver chip embedded in shipping containers, and movement of the wireless-enabled device may be used to track the shipping containers. In another example, movement of the wireless-enabled device may be used to control how often the wireless-enabled device performs GPS or other location tracking operations. If the wireless-enabled device is determined to not be in motion, the GPS or other location tracking operations may be suspended because the location of the wireless-enabled device is not changing. Suspending such operations may improve the speed and power consumption of the wireless-enabled device.

Detecting motion of a person or other object in a vicinity of the wireless-enabled device may provide information indicative of whether the person is near the wireless-enabled device. That is, detecting movement of the person may indicate that the person is approaching the wireless-enabled device. Detecting the approach of the person may be used to exit a screensaver mode, unlock or wake up the wireless-enabled device, or otherwise prepare the wireless-enabled device for use by the person. In another example, detecting the approach of the person may be used by a surveillance system to detect that one or more people are present in a monitored environment. In one embodiment, object motion may have to be within sufficient proximity (e.g., 5 m) before its effects on channel characteristics are detectable. In such an embodiment, detection of the fading dynamics may be used for proximity detection. Further, one instance of detecting motion of the person may require the wireless-enabled device to remain stationary. For example, an indication that there is human or other object motion in a vicinity of the wireless-enabled device may be outputted only if the wireless-enabled device is determined to be not moving.

Returning to FIG. 1, detection of motion of a wireless-enabled device, such as wireless-enabled device 110, or of an object, such as object 130, may be based on channel characteristics of wireless signals received by wireless-enabled device 110. The channel characteristics may measure signal fading from interference caused by reflections, delays, and attenuations of the signal. For example, as illustrated in FIG. 1, wireless-enabled device 110 may receive multiple copies of a wireless signal broadcasted from a transmitter 120 of system 100. A copy of the signal may directly reach wireless-enabled device 110 or may take a path that involves one or more reflections, delays, or attenuations. An indoor environment may particularly offer many different paths by which a signal can reach a receiver. The multiple copies of the wireless signal that arrive at wireless-enabled device 110 may interfere with each other. For example, because the copies may have each propagated a different distance to reach wireless-enabled device 110, they may be out of phase at wireless-enabled device 110 and may thus destructively interfere with each other. The destructive interference may be detected as fading attenuation at wireless-enabled device 110. Because phase depends on propagation distance and thus depends on location, channel fading is generally sensitive to changes in wireless-enabled device's 110 location and to environmental changes that may alter signal paths. Because movement of wireless-enabled device 110 changes its location, the movement may be detected through changes in channel fading characteristics measured by wireless-enabled device 110.

Further, movement of an object, such as a person, in the environment may also be detected. Copies of a wireless signal may reflect off the person, and movement of the person may shift where the copies of the wireless signal are reflected and may thus alter their signal paths. The altered signal paths may be detected through a change in channel fading characteristics of wireless signals received by wireless-enabled device 110. Further, wireless-enabled device 110 may be configured to distinguish between movement of the wireless-enabled device and movement of an object in a vicinity of the wireless-enabled device. As discussed in more detail below, how channel fading characteristics change in the former situation may be different than how channel fading characteristics change in the latter situation. Thus, distinguishing between statistical properties of the channel fading characteristics in the two situations may allow wireless-enabled device 110 to distinguish between motion of the wireless-enabled device and motion of the object.

Wireless-enabled device 110 may be, for example, a laptop, desktop, or tablet computer having wireless networking capabilities, a cellular phone, a wireless-enabled patient monitoring device, or any other electronic wireless-enabled device configured to receive a wireless signal. Wireless-enabled device 110 may include a receiver 111 configured to receive the wireless signal and a processor 113 configured to determine channel characteristics of the wireless signal, detect motion based on the channel characteristics, or perform both operations.

In one embodiment, receiver 111 may be configured to receive a wireless signal that has one or more frequencies in a radio frequency (RF) range. In one non-limiting example, receiver 111 may be responsive to WiFi™ data packets having frequency content in a 20 MHz or 40 MHz channel based around 2.4 GHz or 5 GHz, or otherwise in accordance with the IEEE 802.11a, b, g, or n standard. In another non-limiting example, receiver 111 may be configured to receive a data packet transmitted based on WiMax™ or any other implementation of the IEEE 802.16 standard or based on an implementation of the LTE standard. It will be appreciated that wireless signal is not limited to any specific standard and the examples discussed may be implemented separately or in combination with each other.

Moreover, in one embodiment, receiver 111 may include 2, 3, or 4 antennas that each operate as a receiver chain in a MIMO configuration. In some cases, receiver 111 may be an Intel WiFi™ Link 5300 (iwl 5300) wireless network adapter card.

In some cases, wireless-enabled device 110 may not have a processor. In such an embodiment, a received packet may be relayed to a separate device, such as a server, for determining channel characteristic information, such as a fading profile or fading change.

Transmitter 120 of system 100 may be a WiFi™ access point, WiMax™ access point, or any other wireless access point. Transmitter 120 may include one or more antennas configured to transmit a wireless signal in one or more directions. In one embodiment, transmitter 120 may be configured to transmit a wireless signal in the form of a wireless packet, such as a beacon packet.

Figure 2A:
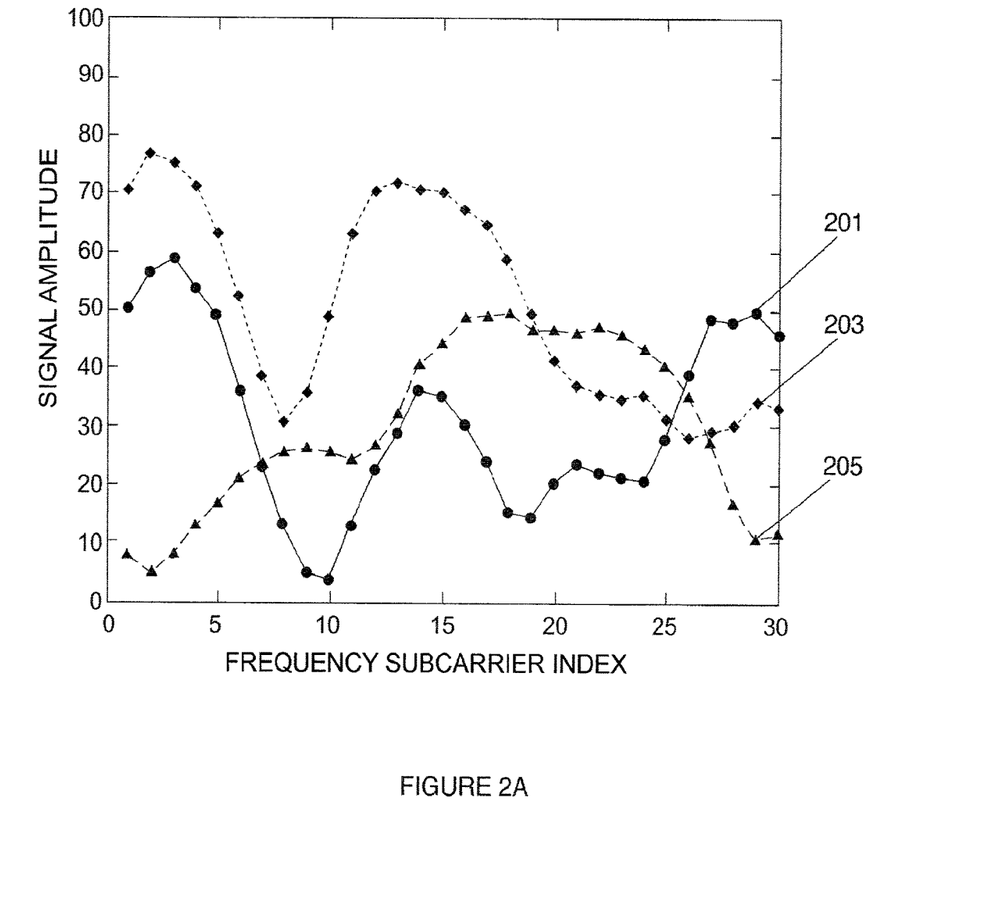
FIGS. 2A-2C depict example channel fading profiles, in accordance with various aspects and principles of the present disclosure.

To detect motion, channel characteristics of a wireless signal transmitted by transmitter 120 and received by wireless-enabled device 110 may be analyzed. The channel characteristics may include a wireless signal's fading profile, which represents how copies of the wireless signal interfere at wireless-enabled device's 110 location. FIG. 2A illustrates fading profiles 201, 203, and 205, that correspond to how a wireless signal fades at three different locations. As discussed above, phase differences that cause fading are location-sensitive. That is, movement introduces fading dynamics, such as changes in fading profiles, measured by a receiver. The fading dynamics result from changes to signal propagation distances and phases as the wireless-enabled device is moved to new locations. Movement of a receiver by several centimeters, for example, may affect the fading. By way of illustration, fading profiles 201, 203, and 205 were measured at three locations spaced 5 cm apart.

Fading profiles 201, 203, and 205 may include a set of channel response values that each correspond to a frequency. A fading profile may thus capture the fading behavior over a range of frequencies. In one example, the range of frequencies may correspond to subchannels (e.g., subcarrier frequencies) at which receiver 111 is responsive. For a WiFi™ receiver, for example, the fading profile may be calculated to determine channel response values over a range of subchannels (e.g., 30, 64, or 128 subchannels) in a 2.4 GHz band. The channel response values may be scalar values that indicate signal amplitude or may be complex values that also include phase information. The fading profile may be generated by a discrete Fourier transform of a data packet, by channel estimation on different subchannels from preamble synchronization, or by any other technique.

Figure 2B:
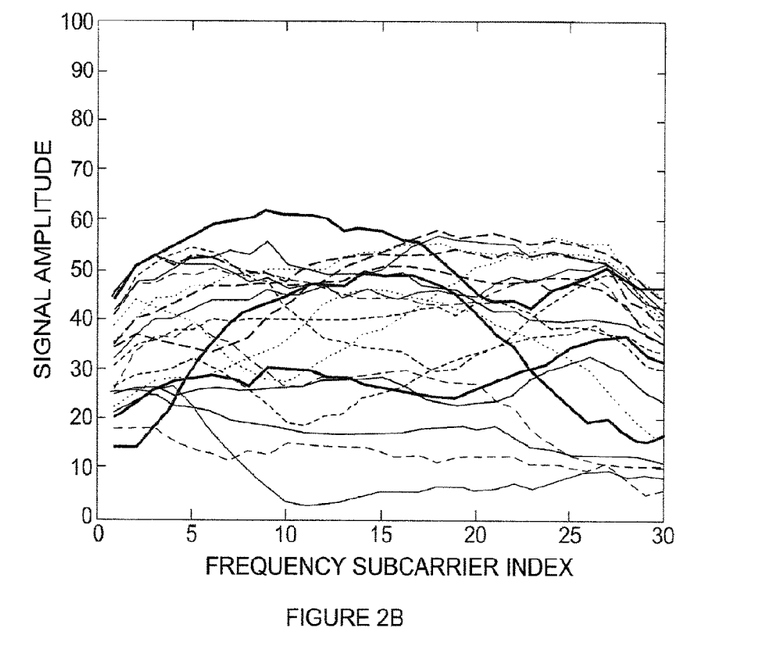
Figure 2C:
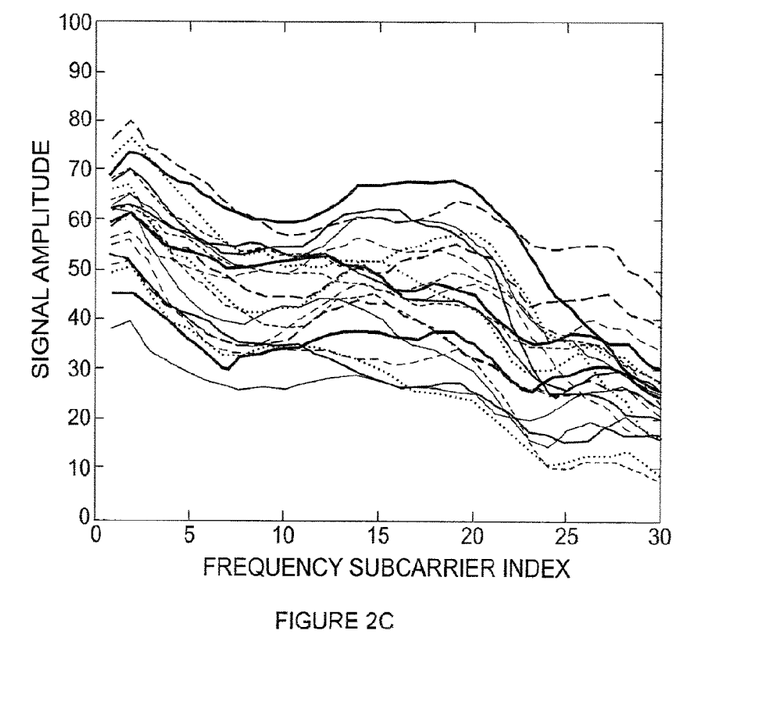

As discussed above, wireless-enabled device 110 may be configured to distinguish between movement of the wireless-enabled device and movement of an object in the vicinity of the wireless-enabled device. FIG. 2B illustrates example fading profiles measured by wireless-enabled device 110 when the wireless-enabled device is moving, and FIG. 2C illustrates example fading profiles measured by wireless-enabled device 110 when the wireless-enabled device is stationary and an object in the vicinity of wireless-enabled device 110 is moving. FIG. 2B illustrates that when wireless-enabled device 110 moves to various locations, fading profiles measured by the wireless-enabled device appear to change much more randomly than when wireless-enabled device 110 is stationary, while FIG. 2C illustrates that when wireless-enabled device 110 is stationary and an object in the vicinity of wireless-enabled device 110 is moving, the fading profiles change, but still appear to show a similar trend. The similar trend exists because although movement of the object may alter some signal paths by changing where they reflect off the object, the moving object affects only a subset of the paths that a wireless signal may take to reach the location of wireless-enabled device 110. Thus, the moving object may still introduce fading dynamics, which may resemble Gaussian noise that varies the measured fading profile as the object moves, but the varied fading profiles may still all show similar frequency-dependent patterns. Thus, analyzing fading profiles and statistical properties of the fading profiles may indicate whether detected motion is consistent with device motion or consistent with object motion.

Figure 3:
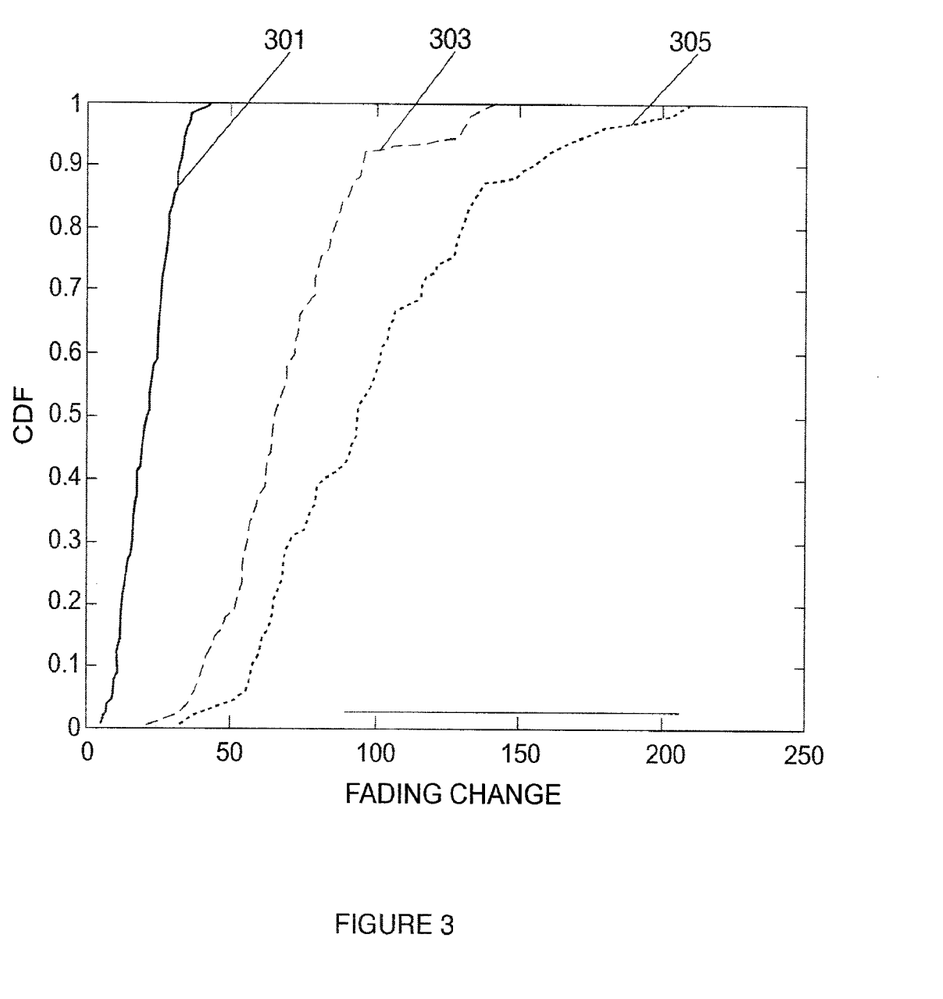
FIG. 3 illustrates example cumulative distribution functions of fading changes in static, device motion, and object motion situations, in accordance with various aspects and principles of the present disclosure.

FIG. 3 further illustrates that motion of the wireless-enabled device and motion of the object may show statistically different properties. The figure shows example plots of cumulative distribution functions (CDF's) of fading change in a situation in which there is no motion, in a situation in which wireless-enabled device 110 is moving, and in a situation in which wireless-enabled device 110 is stationary and an object in the vicinity of wireless-enabled device 110 is moving. Fading change between two fading profiles may be calculated as, for example, the Euclidean distance between the two fading profiles. Plots 301, 303, and 305 show a CDF of fading change corresponding to the no motion, object motion, and device motion situations, respectively. As illustrated in FIG. 3, fading change measured by a moving wireless-enabled device 110, as evidenced by plot 305, will likely be greater than fading change measured by a stationary wireless-enabled device 110, as evidenced by plots 301 and 303. Further, fading change measured by the stationary wireless-enabled device 110 if an object in the vicinity is moving, as seen by plot 303, will likely be greater than fading change experienced by the stationary wireless-enabled device if no object in the vicinity is moving, as shown by plot 301.

Figure 4:
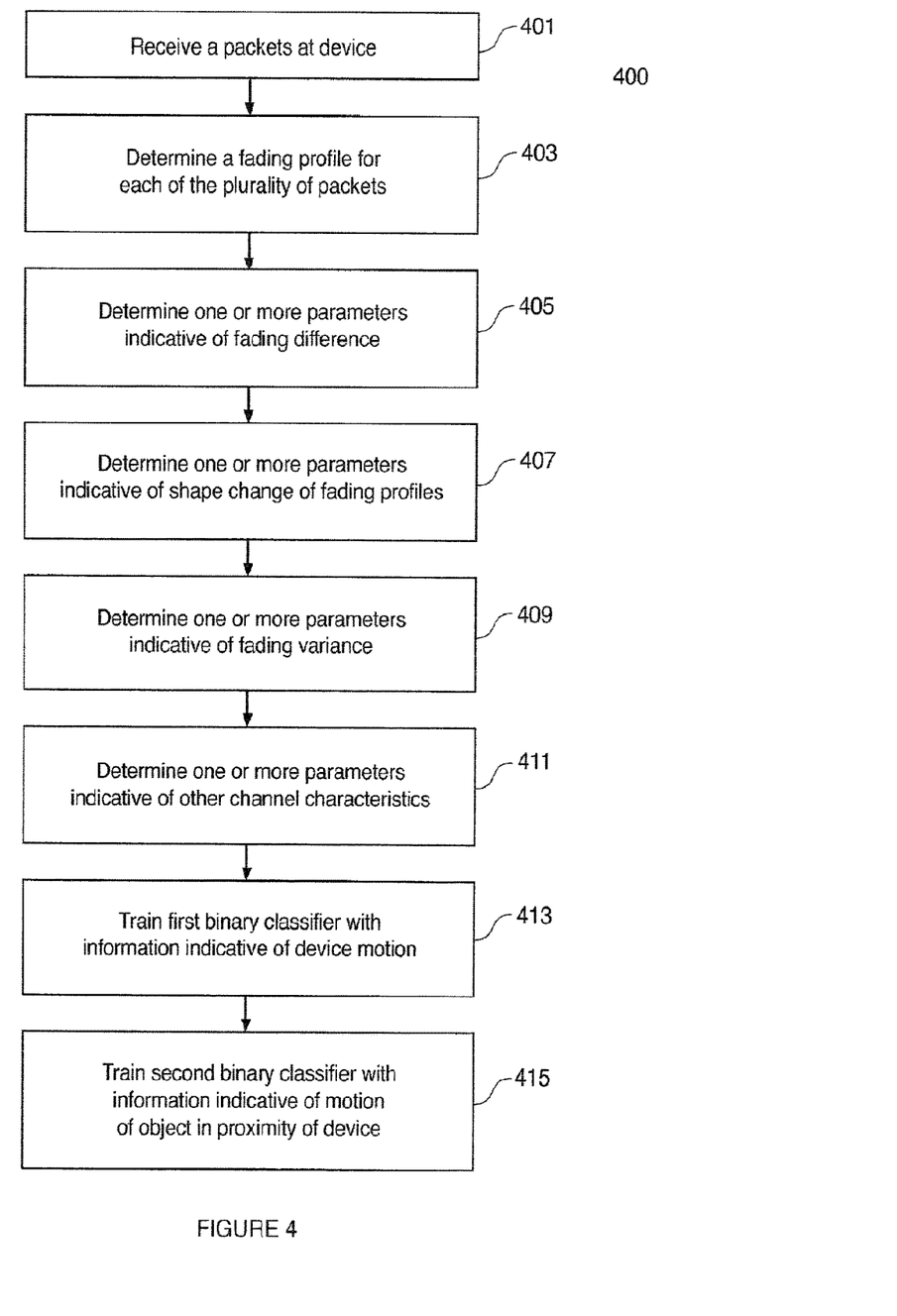
FIG. 4 illustrates a method for determining channel characteristics, in accordance with various aspects and principles of the present disclosure.
Figure 5A:
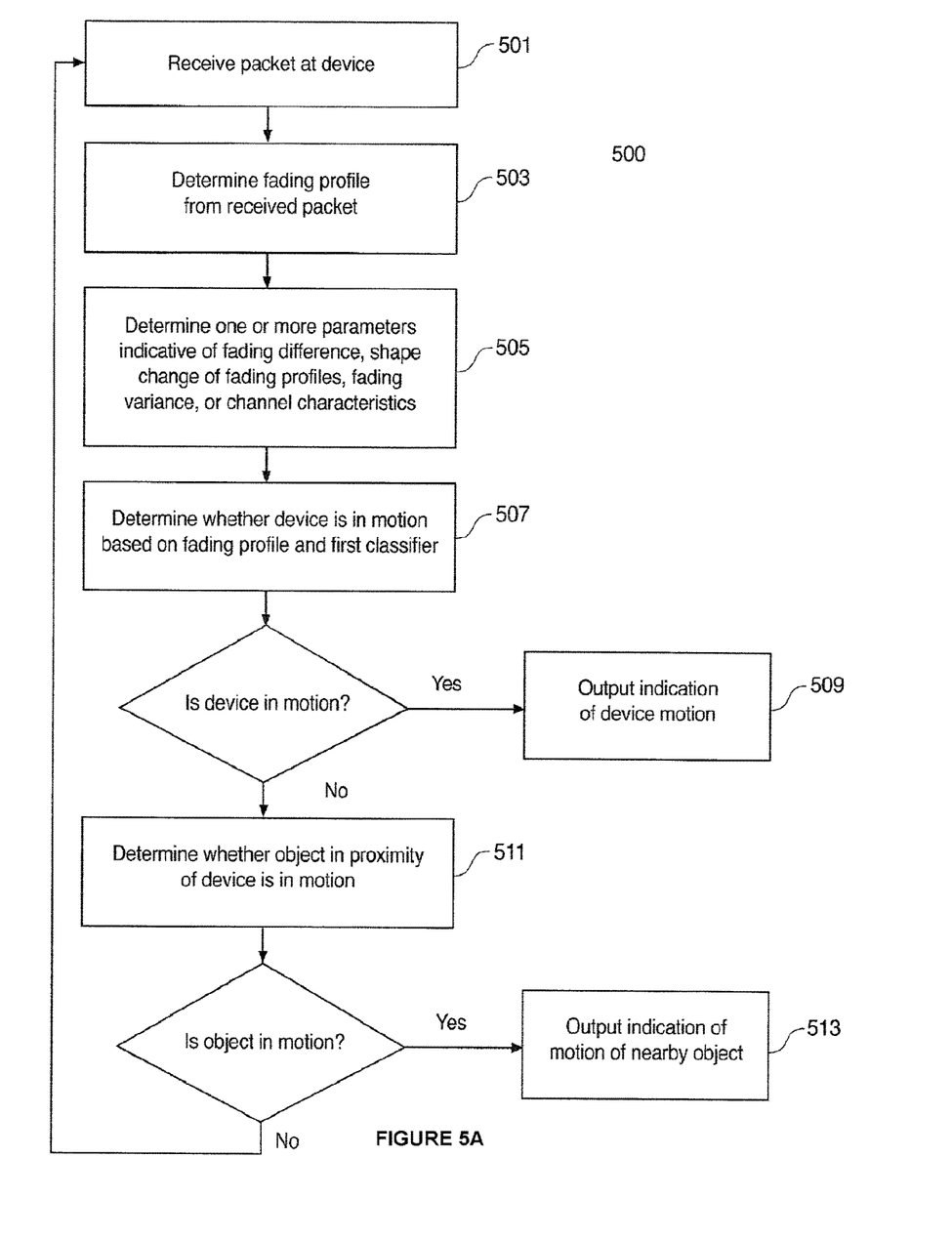
FIG. 5A illustrates example operations for detecting motion based on channel characteristics, in accordance with various aspects and principles of the present disclosure.

The motion detection discussed above is illustrated in more detail in FIGS. 4 and 5A. FIG. 4 illustrates a process 400 for determining channel characteristics (e.g., fading profile and fading changes) associated with a moving wireless-enabled device or with a moving object, in accordance with various aspects and principles of the present disclosure. FIG. 5A illustrates a process 500 for using the determined channel characteristics to then distinguish between a situation in which there is no motion, a situation in which a wireless-enabled device is moving, and a situation in which an object in the wireless-enabled device's vicinity is moving. More particularly, FIGS. 4 and 5A will illustrate using the determined channel characteristics to first train a classifier function, and then using the classifier function to distinguish between the three situations discussed above. Training a classifier function may be part of a supervised learning technique in which a first set of channel characteristics may be determined by moving the wireless-enabled device and a second set of channel characteristics may be determined by keeping the wireless-enabled device stationary and having an object move in the vicinity of the wireless-enabled device. The classifier may be trained to associate the first set of channel characteristics with movement of the wireless-enabled device and may be trained to associate the second set of channel characteristics with movement of the object. The trained classifier may then be used to determine, based on subsequently measured channel characteristics, whether there is no motion, whether there is device motion, or whether there is object motion.

Returning to FIG. 4, at operation 401 of process 400, a packet or any other form of wireless signal may be received.

The packet may be received by receiver 111 of wireless-enabled device 110, or by any other wireless-enabled device. In some cases, the packet may be received after sampling a wireless medium or a data buffer. The sampling may be performed at a rate of, for example, 10 Hz, 50 Hz, 100 Hz, or 1 KHz. In one embodiment, a timestamp $t_i$ may be associated with the received packet.

Although operation 401 describes receiving one packet, additional packets may be received and used to determine channel characteristics. That is, the channel characteristics may account for fading dynamics among a plurality of packets that are received at various instances in time. Calculation of a channel characteristic and training of a classifier may be updated as additional packets are received. The calculation of channel characteristic and the training of the classifier may be based on hundreds, thousands, or tens of thousands of packets.

After a packet is received, a channel characteristic such as a fading profile of the packet may be determined at operation 403. The fading profile may be determined by processor 113 or any other computing or control circuitry that may be external to wireless-enabled device 110. The fading profile, which may have characteristics resembling those illustrated in FIGS. 2A-2C, may indicate how signal strength of the packet fades across the channel on which the packet is modulated. The fading profile may be associated with timestamp $t_i$ and may be represented as $F_i = \{f_{i,k}\}_{k=1 \ldots N}$, where $f_{i,k}$ is a frequency response at subcarrier k at time instance i, and N represents the total number of subchannels scanned by a wireless-enabled device. For example, the fading profile may indicate a signal strength across 30 subchannels used in the IEEE 802.11 standard. In one embodiment, the fading profile may be determined by applying a discrete Fourier transform on the received packet.

After determining the fading profile, one or more parameter values for various categories of channel characteristics may be determined at operations 405-411. Determination of a parameter value may include initially calculating the parameter value or updating the parameter value. Like all other operations described herein, operations 405-411 may be performed in any order, or may be performed simultaneously.

At operation 405, one or more parameters that are indicative of fading difference may be determined, such as by processor 113 or any other computing or control circuit external to wireless-enabled device 110. The one or more parameters may capture a level of recent fading change among fading profiles of received packets.

In one embodiment, the one or more parameters determined at operation 405 may compare any number of fading profiles. Comparing the fading profiles may indicate how they change in response to different types of movement. How a fading profile may change in response to device motion may be different than how it changes in response to object motion. Various statistics may be used to compare fading profiles. When comparing two fading profiles, an average, maximum, minimum, median, or other statistic may be used to represent differences (e.g., differences across multiple subchannels) between the two fading profiles. When comparing more than two fading profiles, the fading profiles may be paired and compared two at a time, and multiple comparisons may be made for multiple pairs of fading profiles. A statistic may then be calculated for the multiple comparisons. As an example, one parameter may compare three fading profiles, such as those having the three most recent time stamps. The comparison may calculate a difference between a first fading profile and a second fading profile, and calculate a difference between the second fading profile and a third fading profile. For each subchannel of the fading profiles, the comparison may take a maximum of the two calculations. Finally, an average of the maxima across the subchannels may be outputted as the parameter value.

Concurrently or in sequence with determining the one or more fading difference parameters, one or more parameters that are indicative of the changes in shape of the fading profiles may be determined at operation 407. How the fading profiles change shape may be related to whether the wireless-enabled device is moving or whether an object in the vicinity of the wireless-enabled device is moving. In one embodiment, determining the one or more parameters may include computing a Pearson's correlation coefficient between two fading profiles. The Pearson's correlation between fading profiles X and Y may be calculated as $$\rho_{X,Y} = \frac{\mathrm{Cov}(X,Y)}{\sigma_X \sigma_Y} = \frac{E[(X-\mu_X)(Y-\mu_Y)]}{\sigma_X \sigma_Y}.$$

Profiles X and Y may be any two fading profiles.

Concurrently or in sequence with determining the one or more parameters of changes in shape of fading profiles, one or more parameters indicative of fading variance may be determined at operation 409. The one or more fading variance parameters may capture a statistical distribution of fading profiles of, for example, recently received packets. In one embodiment, the fading variance may be determined by computing an average channel response at each subchannel of the fading profiles and then computing the average variance of each subchannel.

Concurrently or in sequence with determining the one or more fading variance parameters, one or more parameters indicative of other channel characteristics may be determined at operation 411. The other channel characteristics may include channel coherence bandwidth, power delay profile, or any other characteristics related to channel response.

Armed with the fading profiles and parameters respectively generated by operations 403-411, process 400 may train a classifier function to distinguish between no movement, movement of the wireless-enabled device, and movement of an object in the vicinity of a stationary wireless-enabled device. The classifier function may cascade a first binary classifier function and a second binary classifier function. The first binary classifier function may determine whether the wireless-enabled device is moving, while the second binary classifier function may determine whether the object is moving.

The first binary classifier may be trained at operation 413 to distinguish between whether the wireless-enabled device is moving or whether the wireless-enabled device is stationary. In one embodiment, the first binary classifier function may comprise a linear combination of one or more parameters determined at operations 405-411. In some instances, the first binary classifier function may be based on fewer than ten parameters. The first binary classifier function at operation 413 may be trained with one set of parameter values in which the wireless-enabled device was known to be moving and with one set of parameter values in which the wireless-enabled device was known to be stationary. In more specific instances, all objects in a vicinity of the wireless-enabled device may also be known to be stationary for both the former and latter set of parameter values.

In sequence or concurrently with training the first binary classifier function, the second binary classifier function may be trained at operation 415 to distinguish between whether an object in the vicinity of the wireless-enabled device is moving or whether there is no moving object. In one embodiment, the second binary classifier function may comprise a linear combination of one or more parameters determined at operations 405-411. In some instances, the second binary classifier function may be based on fewer than ten parameters. The second binary classifier function may be trained with one set of parameter values in which the object was known to be moving and with one set of parameter values in which the object was known to be stationary. In more specific instances, the wireless-enabled device may also be known to be stationary for both the former and latter set of parameter values.

As noted above, one or more operations of process 400 may be performed on, for example, wireless-enabled device 110, or may be performed on a separate device, such as a server. For example, packet or other information may be relayed from wireless-enabled device 110 to a server, which may perform more computationally intensive operations.

After the classifier function is trained by process 400, it may be used by process 500, illustrated in FIG. 5A, to determine whether there is device or object motion based on subsequently received wireless packets. A wireless packet or any other wireless signal may be received at operation 501. Like at operation 401, the packet may be received by receiver 111 of wireless-enabled device 110, or by any other wireless-enabled device. Additional packets may be received and used to determine channel characteristics associated with the plurality of packets.

After a packet is received, a fading profile for the received packet may be determined at operation 503. Like at operation 403, the fading profile may indicate how signal strengths of the packet fade across a channel on which the packet is modulated. In one embodiment, the fading profile may be determined by applying a discrete Fourier transform on the received packet.

After the fading profile is determined, one or more parameters indicative of fading difference, of changes in shape of fading profiles, of fading variance, or of other channel characteristics may be determined at operation 505. Determination of the one or more parameters may be similar to the determination of the one or more parameters described at operations 405-411. Further, determination of the one or more parameters may be based on the most recently received packet as well as on previously received packets.

With one or more parameter values indicative of channel characteristics calculated, whether the wireless-enabled device is moving may be determined at operation 507. A classifier function may be used to determine whether the wireless-enabled device is moving based on the one or more parameter values. While the overall classifier function may be configured to determine whether there is no motion, whether there is device motion, or whether there is object motion, determination of device motion may be performed by a first portion of the overall classifier function. The first portion may be a first binary classifier function that is trained to distinguish between device motion and no device motion at operation 507. The first binary classifier function may have been trained at operation 413.

If it is determined at operation 507 that the wireless-enabled device is in motion, an indication of device motion may be outputted at operation 590. The indication may be outputted to, for example, an application running on wireless-enabled device 110, or may be outputted to an external device such as a server.

If it is determined that the wireless-enabled device has not moved, motion of the object may be determined at operation 511. The determination may be based on the one or more parameter values calculated from one or more fading profiles of one or more packets. A second portion of the overall classifier function may be used to determine whether there is a moving object. The second portion may include a second binary classifier function trained to distinguish between object motion and a lack of object motion. The binary classifier function may have been trained, for example, at operation 415. If it is determined at operation 511 that the object is moving, an indication of the object's movement may be outputted at operation 513. Although FIG. 5A shows operation 507 performed before operation 511, operations of process 500 may be performed in any order. Some operations may be performed simultaneously.

Figure 5B:
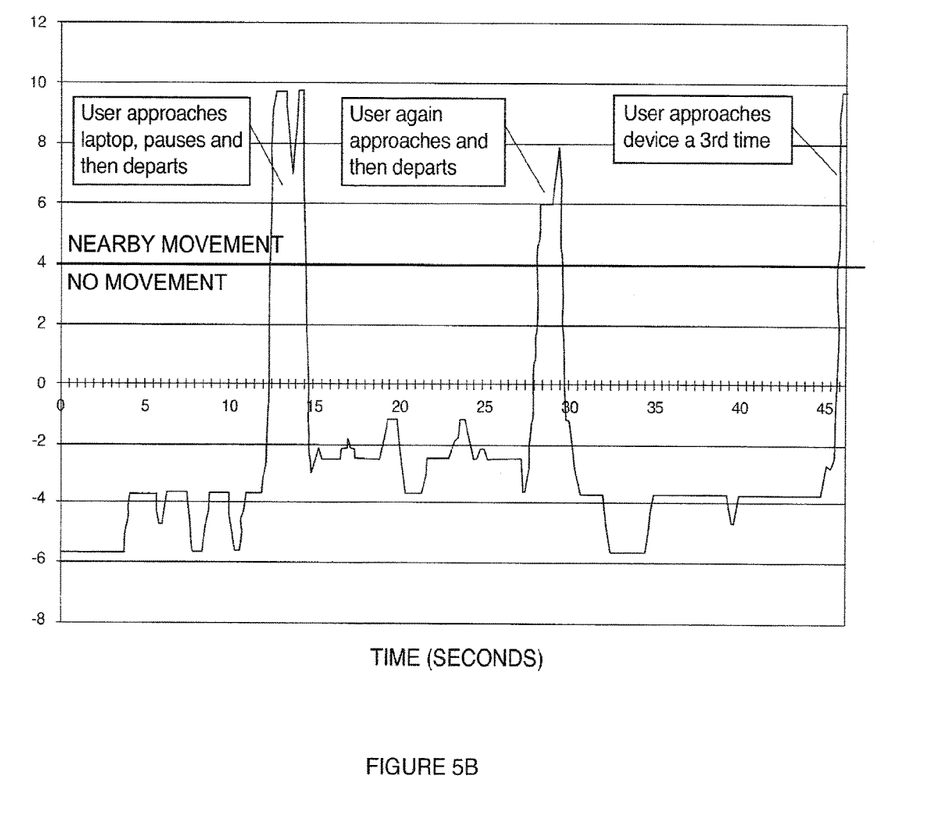
FIG. 5B illustrates an example plot of classifier output values used for detecting motion, in accordance with various aspects and principles of the present disclosure.

A graphical illustration of using a classifier function to detect motion is presented in FIG. 5B. The plot shown in FIG. 5B may, for example, be output values that correspond to calculations performed by a classifier function. The classifier function may use a threshold to distinguish between output values that are consistent with motion and output values that are consistent with no motion. For example, as shown in FIG. 5B, if an output value exceeds a threshold of 4, a binary output of object motion may be indicated. If the output value is less than the threshold of 4, a binary output of no motion may be indicated.

Figure 6:
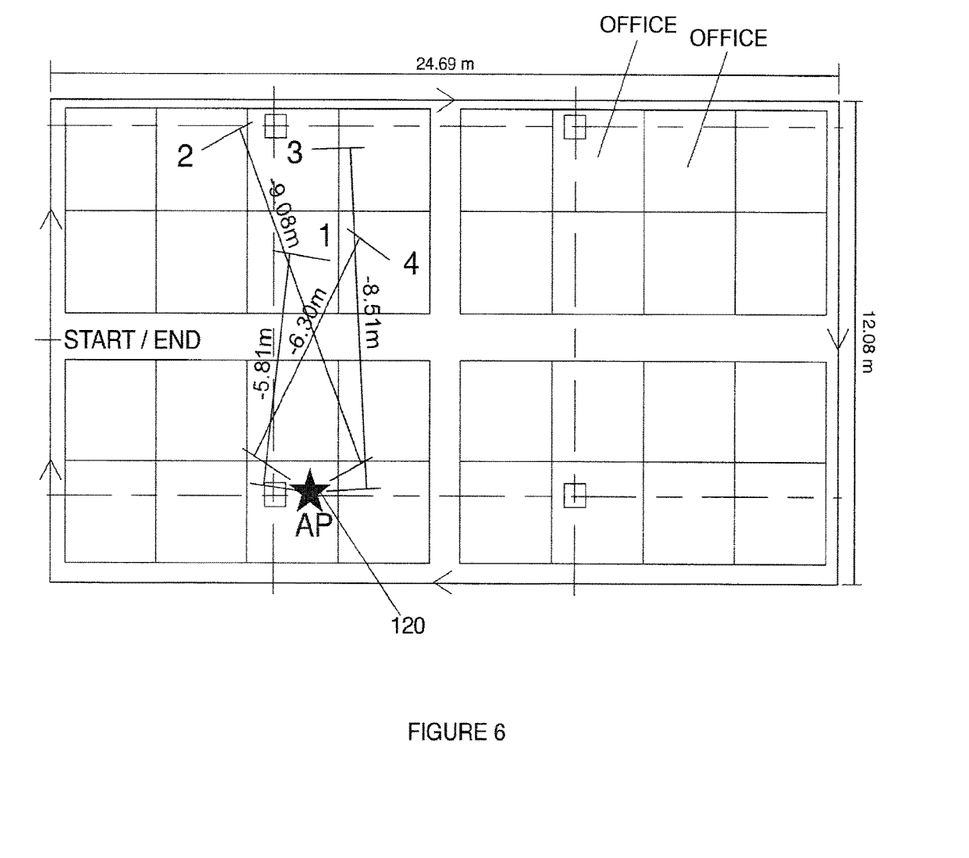
FIG. 6 illustrates an example environment for detecting motion based on channel fading profiles, in accordance with various aspects and principles of the present disclosure.

Another illustration of motion detection in an indoor environment is shown in FIG. 6. The figure shows an example indoor environment (e.g., cubicles in an office) that may create many paths for which a wireless signal broadcasted by transmitter 120 may reach wireless-enabled device 110. Wireless-enabled device 110 may move to locations 1, 2, 3, or 4 in the figure. Because the fading profile of a wireless signal at each of those locations may differ, a moving wireless-enabled device 110 may measure different fading profiles of the wireless signals along different points of its movement. Parameter values derived from the fading profiles may be associated with device motion information in a classifier function. Training the binary classifier functions may be performed on wireless-enabled device 110 or any other device in communication with wireless-enabled device 110. In the scenario shown in FIG. 6, wireless-enabled device 110 is moving and no object is moving relative to wireless-enabled device 110. A first binary classifier function may then be trained to associate parameter values with device motion. A second binary classifier function may then be trained to associate parameter values with a lack of object motion.

After the classifier functions have been trained, they may be used by wireless-enabled device 110 to detect motion based on subsequently received wireless signals. Wireless-enabled device 110 may determine fading profiles of the wireless signals, and may derive one or more channel characteristics parameters from the fading profiles. Wireless-enabled device 110 may input the one or more parameters into the first binary classifier to determine whether the wireless-enabled device itself is moving. If wireless-enabled device 110 is determined to be not moving, wireless-enabled device 110 may input the one or more parameters into the second binary classifier to determine whether a person or any other object in the vicinity of the wireless-enabled device is moving. The two binary classifiers may be used in any order or may be used simultaneously. In one embodiment, if one binary classifier yields a positive indication of motion, use of the other binary classifier may be skipped.

Figure 7:
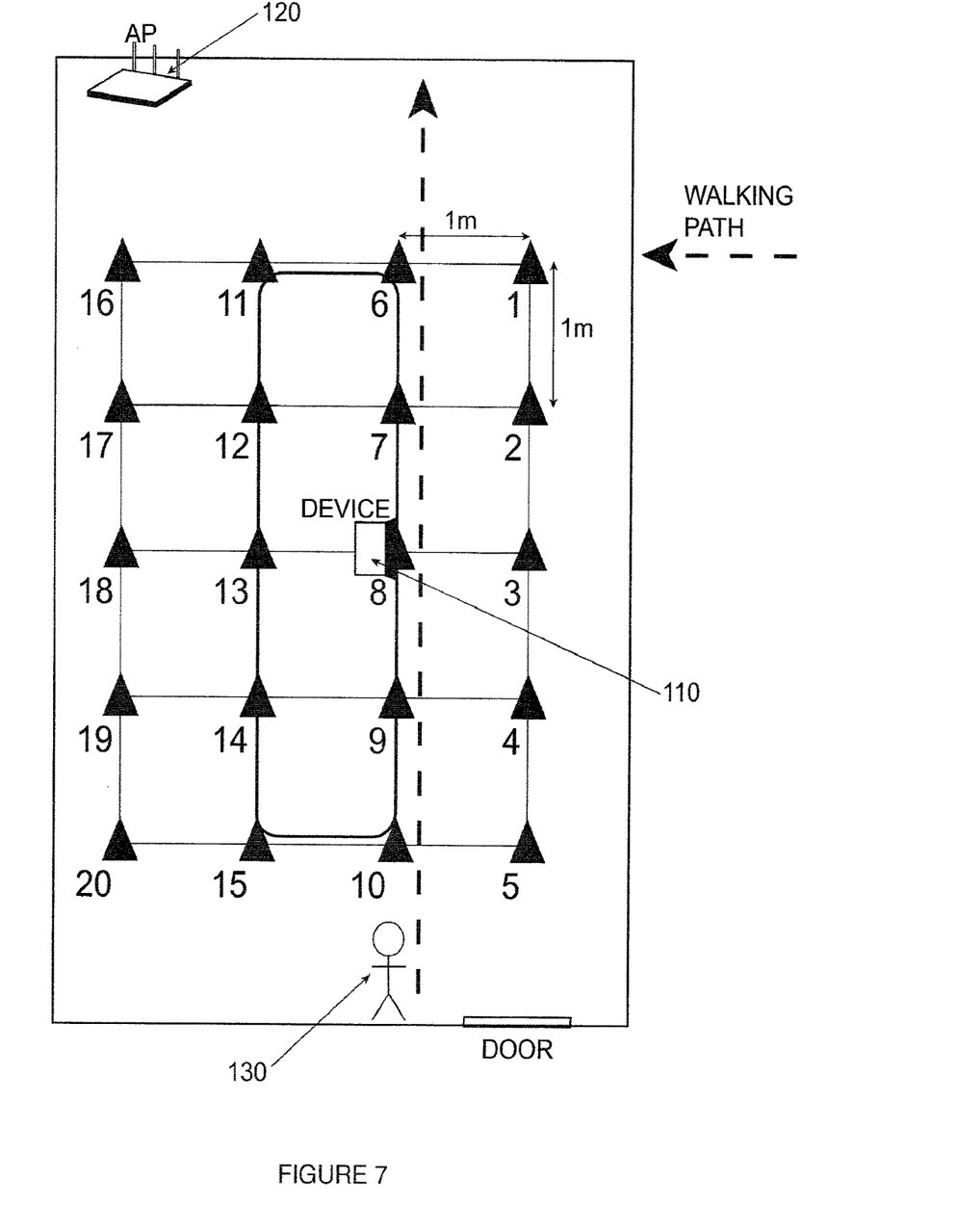
FIG. 7 illustrates an example environment for detecting motion based on channel fading profiles, in accordance with various aspects and principles of the present disclosure.

FIG. 7 presents another illustrative example of motion detection in an indoor environment. FIG. 7 shows a conference room that may create many paths for which a wireless signal broadcasted by transmitter 120 may reach wireless-enabled device 110. The indoor environment may include one or more objects, such as people, standing at various locations (labeled 1-20 in the figure). A person 130 may be moving in the environment in a path illustrated in FIG. 7, and his movement may alter a subset of paths on which a signal may reach wireless-enabled device 110. The subset of paths may be altered because signals may reflect off the person 130, and movement of the person changes where some signals are reflected.

Person 130's movement may be associated with changes to fading profiles of wireless signals that are affected by the movement. Parameters related to fading profile changes or other channel characteristics may be associated with the person's movement. In the scenario shown in FIG. 7, in which wireless-enabled device 110 is stationary and person 130 is moving, a first binary classifier may be trained to associate the channel characteristics with a lack of device motion, and a second binary classifier may be trained to associate the channel characteristics with object motion.

After the classifier functions have been trained, they may be used by wireless-enabled device 110 to detect motion based on subsequently received wireless signals. For example, one or more parameter values indicative of channel characteristics may be calculated based on wireless signals received by device 110. The first binary classifier may be used to determine, based on the one or more parameter values, whether device 110 is moving. The second binary classifier may be used to determine, based on the one or more parameter values, whether an object in the vicinity of the device is moving.

Figure 8:
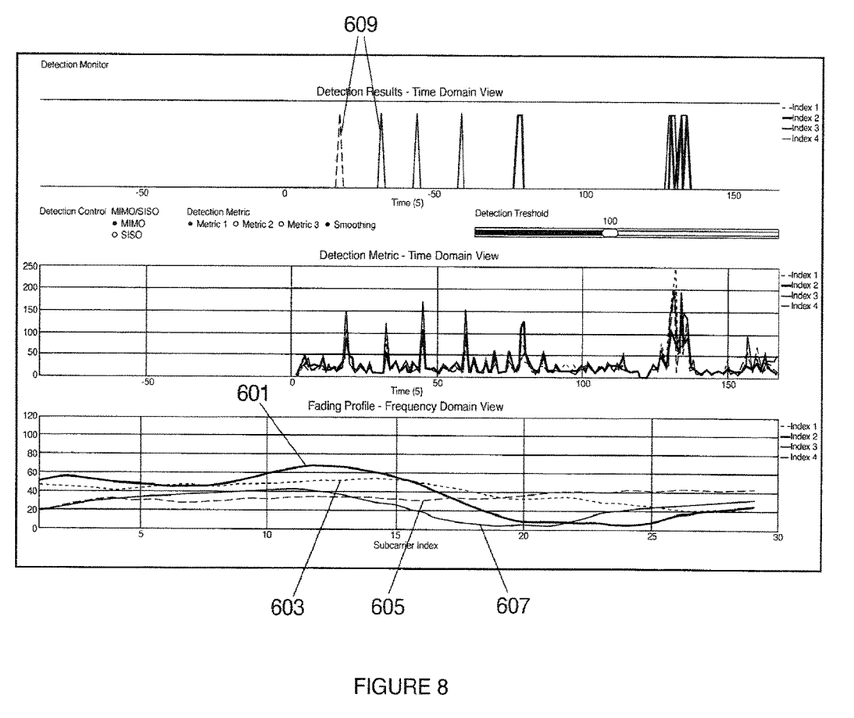
FIG. 8 illustrates an example view that presents fading profiles and motion detection results, in accordance with various aspects and principles of the present disclosure.

An example view of a program based on the processes described herein is illustrated in FIG. 8. The view may present, for example, plots 601, 603, 605, and 607 of the fading profiles of four wireless signals received at the wireless-enabled device. The view may further present a detection metric, such as output values calculated for a classifier function. If the detection metric exceeds a threshold, the detection metric may be interpreted as a motion detection event and may be shown as plots 609.

Having thus described the novel concepts of the motion detection apparatus, method, and system, it will be apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A method for detecting motion with a device, comprising:
    determining, at the device, one or more parameters indicative of a change in fading experienced by a wireless signal received by the device, wherein the determining the one or more parameters include:
        determining a fading profile indicative of how the wireless signal received by the device experiences fading at the device, and
        determining a second fading profile indicative of how a second wireless signal received by the device experiences fading at the device, wherein the one or more parameters are indicative of one or more differences between the fading profile and the second fading profile;
    determining, based on the one or more parameters indicative of the change in fading, whether a first of the device and an object in an environment of the device is moving; and
    responsive to a determination that the first of the device and the object is not moving, determining, based on the one or more parameters indicative of the change in fading, whether a second of the device and the object is moving, wherein a change in fading when the device is moving is greater than a change in fading when the device is stationary and the object is moving.

2. The method of claim 1, wherein determining whether the device is moving is based on a classifier function that relates the one or more parameters to whether the device is moving.

3. The method of claim 2, further comprising training the classifier function before determining whether the device is moving, wherein training the classifier function comprises associating one or more values of the one or more parameters with movement of the device.

4. The method of claim 1, wherein determining whether the object is moving is based on a classifier function that relates the one or more parameters to whether the object is moving.

5. The method of claim 4, further comprising training the classifier function before determining whether the object is moving, wherein training the classifier function includes associating one or more values of the one or more parameters with movement of the object.

6. The method of claim 1, wherein the one or more parameters are indicative of one or more differences in shape between the fading profile and the second fading profile.

7. The method of claim 6, wherein the one or more parameters are indicative of variance or standard deviation among at least the fading profile and the second fading profile.

8. The method of claim 1, wherein the wireless signal comprises an IEEE 802.11 signal, IEEE 802.16 signal, or a Long-Term Evolution (LTE) signal, and wherein the fading profile is a channel fading profile indicative of how the wireless signal undergoes frequency-selective fading at the device.

9. A device, comprising:
    a receiver configured to receive a wireless signal; and
    one or more processors communicatively coupled to the receiver, the one or more processors configured to:
        determine one or more parameters indicative of a change in fading experienced by a wireless signal received by the device by determining a fading profile indicative of how the wireless signal received by the device experiences fading at the device, and determining a second fading profile indicative of how a second wireless signal received by the device experiences fading at the device, wherein the one or more parameters are indicative of one or more differences between the fading profile and the second fading profile;

determine, based on the one or more parameters indicative of the change in fading, whether a first of the device and an object in an environment of the device is moving; and responsive to a determination that the first of the device and the object is not moving, determine, based on the one or more parameters indicative of the change in fading, whether a second of the device and the object is moving, wherein a change in fading when the device is moving is greater than a change in fading when the device is stationary.

10. The device of claim 9, wherein the one or more processors are configured to determine whether the device is moving based on a classifier function that relates the one or more parameters to whether the device is moving.

11. The device of claim 10, wherein the one or more processors are further configured to train the classifier function by associating one or more values of the one or more parameters with movement of the device.

12. The device of claim 9, wherein the one or more processors are configured to determine whether the object is moving based on a classifier function that relates the one or more parameters to whether the object is moving.

13. The device of claim 12, wherein the one or more processors are further configured to train the classifier function by associating one or more values of the one or more parameters with movement of the object.

14. The device of claim 9, wherein the one or more parameters are indicative of one or more differences in shape between the fading profile and the second fading profile.

15. The device of claim 14, wherein the one or more parameters are indicative of variance or standard deviation among at least the fading profile and the second fading profile.

16. The device of claim 9, wherein the wireless signal comprises an IEEE 802.11 signal, an IEEE 802.16 signal, or a Long-Term Evolution (LTE) signal, and wherein the one or more processors are configured to determine a fading profile that is indicative of how the wireless signal undergoes frequency-selective fading at the device.

17. The method of claim 1, wherein a change in fading when the device is stationary and the object is moving is greater than a change in fading when both the device and the object are stationary.

18. The device of claim 9, wherein a change in fading when the device is stationary and the object is moving is greater than a change in fading when both the device and the object are stationary.

* * * * *